May 10, 1960
L. E. SHARPE
2,935,884
CONTINUOUSLY DRIVEN LOOP FOR ANGULAR MEASUREMENT
Filed July 31, 1958
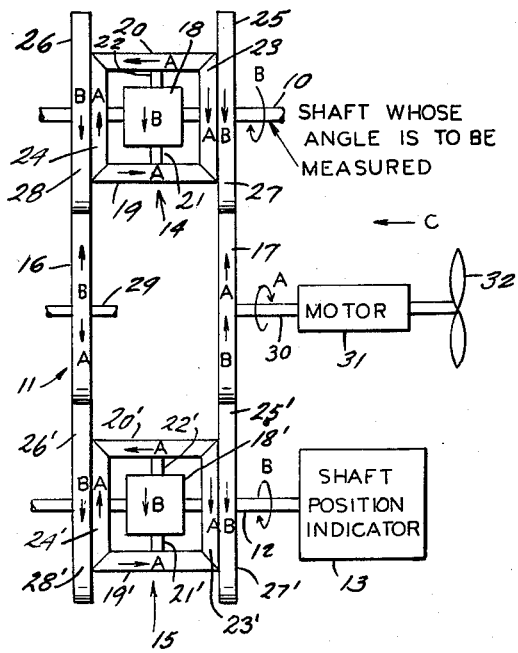
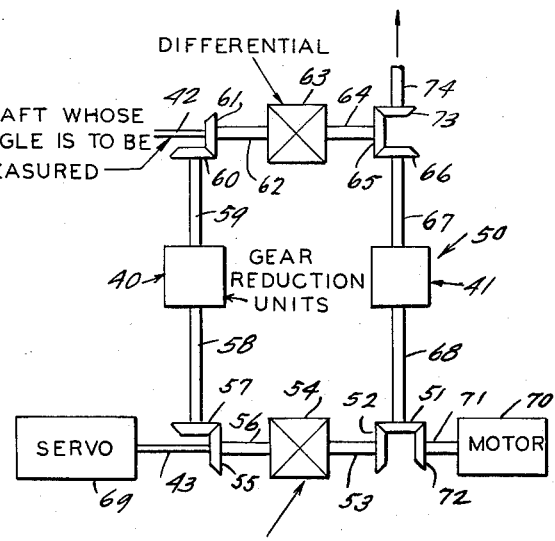
INVENTOR.
LOUIS E. SHARPE
BY Ostrolenk, Faber,
Gerb & Soffen
ATTORNEYS

United States Patent Office 2,935,884
Patented May 10, 1960

2,935,884

CONTINUOUSLY DRIVEN LOOP FOR ANGULAR MEASUREMENT

Louis Everett Sharpe, Malverne, N.Y., assignor to Kollsman Instrument Corporation, Elmhurst, N.Y., a corporation of New York Application July 31, 1958, Serial No. 752,329

12 Claims. (Cl. 74—409)

The instant invention relates generally to means whereby a shaft is connected to means for measuring the angular position of the shaft and more particularly to a continuously driven loop means whereby inaccuracies in gear teeth are averaged out and the effects of backlash do not enter into the measurement.

A shaft and the position indicating means therefor are usually connected through a gear train either to multiply the angular movement or because it is not convenient to mount the indicating means directly to the shaft whose position is being observed or measured. When motion is transmitted through a gear train precision is a function of the quality the teeth of the individual gears and the mating of the gears.

Generally there is no difficulty in manufacturing gears having a given number of teeth. However, it is extremely difficult to maintain uniformity between the shapes of the various teeth. It is even more difficult to construct mating gears so that an angular displacement of the driving gear will result in a precise angular displacement of the driven gear.

The instant invention provides a gear train comprising a continuously driven closed loop to interconnect the driver shaft (shaft whose position is to be observed) to the driven shaft (shaft of the indicator means). The gear train includes two differentials each connected into the loop through symmetrical outputs. One differential is connected to the driver shaft while the other differential is connected to the driven shaft. These connections are made by mounting the rotatable gear carrying elements of the differentials directly on their associated driver and driven shafts.

With the driver shaft stationary, both differentials act as reverted trains so that the driven shaft remains stationary even though the other elements of the gear train are in motion. When the driver shaft is rotated, this causes direct rotation of the gear carrying element of its associated differential. One of the other differential elements appears fixed so that in respect to the movement of the driver shaft the differential acts as an epicyclic train and the gear carrying element imparts twice its angular displacement to the third differential element. This displacement is superimposed on the continuous drive being imparted to the third element, which is part of the driven closed loop gear train.

The displacement is transmitted through the gear train to the other differential where it appears as a rotation of the driven shaft. Any gear tooth errors are balanced out with each gear revolution so that the average position of the driven shaft provides an accurate indication of the position of the driver shaft.

That is, no matter what the gear tooth errors may be, when a given point on a gear tooth has rotated one revolution, so too has the gear rotated one revolution and it has driven its mating gear, if they are in one to one relationship, precisely one revolution. This is independent of the fact that during the one revolution interval the driven gear has not always been displaced the same angular distance as the driver gear.

Since the gear train is always being driven in the same direction, this introduces a drag in the system which prevents the undesirable effects of backlash from being introduced.

Gear reduction boxes may be symmetrically included as part of the driven loop thereby enabling the displacement of the driver shaft to appear multiplied at the driven shaft.

The closed loop requires very little power for its continuous drive and it is convenient to utilize power take-offs from the loop to drive other equipment such as a fan blade. If desired the blade may be mounted directly to the shaft of the motor providing the continuous driving power for the loop.

Accordingly, a primary object of the instant invention is to provide gear means, for interconnecting a shaft to an angular indicating means, whereby imperfections in the gear teeth and backlash will not be introduced into the reading of the indicator means.

Another object is to provide a continuously driven closed loop gear train to interconnect a shaft to an angular indicating means.

Still another object is to provide a closed loop gear train including a pair of differentials connected into the loop through symmetrical outputs.

A further object is to provide a continuously driven closed loop gear train including reduction gearing whereby the motion of a driver shaft appears multiplied at the output shaft of an indicator means.

These as well as other objects of the instant invention shall become readily apparent after reading the following description of the accompanying drawings in which:

Figure 1 is a schematic of my novel continuously driven gear train interconnecting two shafts.

Figure 2 is a schematic illustrating a modification of the gear train of Figure 1 wherein the movement of the driver gear results in a multiplied movement of the driven gear.

At the outset it is to be understood that all shaft bearings, since they form no part of the instant invention, have been omitted from the schematics of Figures 1 and 2 for the sake of brevity and clarity. Similarly, collars and shoulders for maintaining the gear elements in their proper axial shaft positions have also been omitted from the schematics.

Now referring to Figure 1, driver shaft 10, whose angular position is to be measured is interconnected by means of gear train 11 to driven shaft 12 which comprises the input of a shaft position indicator 13. Gear train 11 is a closed loop comprising a first differential assembly 14 associated with driver shaft 10 and a second differential assembly 15 associated with driven shaft 12. Idler spur gears 16 and 17 mounted on shafts 29 and 30 respectively, interconnect differential assemblies 14 and 15.

Differential assemblies 14, 15 are identical devices. Only differential 14 will be described in detail. Corresponding elements of differential 15 will be designated by primed reference numerals.

Differential assembly 14 comprises gear carrying member 18 which is keyed directly to the shaft 10. Idler bevel gears 19, 20 are pivotally mounted to gear carrying member 18 by being mounted for free rotation upon shafts 21 and 22 respectively. Idlers 19 and 20 are mated with bevel sections 23 and 24, forming parts of composite gears 25, 26 respectively, which are freely mounted on driver shaft 10. Spur sections 27, 28 comprise the other sections of composite gears 25, 26, respectively. The number of teeth on each of the spur sections 25, 26, 25', 26', are equal in number to the teeth on each of the spur gears 16, 17. Shaft 30 is the output shaft of motor 31 which may also comprise the driving means for fan blade 32. Gear train 11 is contructed in a manner such that the effect of the continuous rotation of motor 31 will average out so as to have a zero net effect upon the positions of shafts 10 and 12. That is, the rotation of motor shaft 30 in the direction indicated by arrow A which encircles shaft 30 will cause the gear members of train 11 to rotate in the direction indicated by the arrows A drawn on the respective gears.

Viewing the device of Figure 1 from the direction indicated by arrow C, motor 31 drives shaft 30 and spur gear 17 mounted thereto in a clockwise direction. This imparts a counterclockwise rotation to composite gears 25 and 25'. The rotation of composite gear 25 is transmitted through bevel gears 19, 20 to drive composite member 26 in a clockwise direction. Since shaft 10 acts as a fixed member at this time, gear carrying member 18 mounted thereto is also fixed and differential assembly 14 appears as a reverted train. That is, a single revolution of the output composite gear 25 appears as a single revolution in the reverse direction at the output of composite gear 26.

Spur section 28 of composite gear 26 drives spur gear 16 in a counterclockwise direction. Since driven shaft 12, to which composite member 18' is keyed, acts as a fixed member differential assembly 15 also appears as a reverted train. Thus the counterclockwise rotation of composite gear 25' produces a reverse rotation, at the same speed, of composite gear 26'. Spur section 28' in turn drives spur gear 16 in the same direction and at the same speed as spur section 28 drives spur gear 16. Thus the elements of the closed loop while being continuously driven by motor 31 do not impart the rotation of motor 31 to shafts 10 or 12.

A rotation of driver shaft 10 will impart rotation to each element of gear train 11 which will either add or subtract to the rotation imparted to these elements by motor 31. For example, a clockwise rotation of shaft 10 indicated by arrow B, which encircles shaft 10, will cause the various elements of the gear train to have an additional component of rotation in the direction indicated by the arrows B drawn on the respective elements. This is accomplished in the following manner: rotation of shaft 10 causes rotation of gear carrying member 18 in the same direction as the rotation of shaft 10. Since composite members 25 and 26 are part of the loop being continuously driven by motor 31 acting through spur gear 17, with respect to the rotation of shaft 10, differential assembly 14 acts as a locked train and bevel gears 19 and 20 do not have any B rotation about axes 21 and 22. Thus a rotation of gear carrying member 18 will be transmitted through bevel gears 19 and 20 to rotate composite members 25 and 26 through the same angular distance rotated by gear carrying member 18. These rotations B of composite members 25 and 26 are transmitted through spur gears 17 and 16, respectively, to composite members 25' and 26', respectively. Composite members 25' and 26' are freely mounted on driven shaft 12.

Since composite members 25' and 26' are part of the loop being driven continuously by motor 31 acting through spur gear 17, differential assembly 15 also acts as a locked train as to the B component of rotation so that the rotation of composite members 25' and 26' is transmitted through bevel gears 19' and 20' to gear carrying member 18' so that the rotation of gear carrying member 18' is in the same direction as the rotation of composite members 25' and 26' and through the same angular distance. Thus driver shaft 12 is rotated through the same angular distance as driver shaft 10. This rotation appears as a reading at the output of shaft position indicator 13.

The reading is a true indication of the position of driver shaft 10 since any errors which are ordinarily introduced by inaccuracies in the teeth of gear elements will average out during each revolution of these elements which will occur many times per second due to the continuous motion imparted by motor 31 to the elements of the closed loop comprising gear train 11. Since gear carrying members 18 and 18' of differential assemblies 14 and 15, respectively, are mounted directly to the driver 10 and driver 12 shafts respectively, errors due to gear tooth inaccuracies cannot be introduced by the gear carrying members 18 and 18'. Further, the continuous drive imparted by motor 31 to the elements of gear train 11 provides the same effect as a drag on the system which always acts in the same direction regardless of the rotation of shaft 10. Thus, the effects of backlash do not enter into the reading obtained at shaft position indicator 13.

Now referring to Figure 2, which is a modification of my invention as previously described, gear reduction units 40, 41 have been included in the gear train 50 so that a given movement of driver shaft 42 will appear multiplied at the driven shaft 43. Gear train 50 is a closed loop comprising, in order, bevel gear 51 in mesh with bevel gear 52 mounted on shaft 53 which is connected to one of the symmetrical outputs of differential assembly 54. Bevel gear 55 is mounted to shaft 56 which is connected to the other symmetrical outputs of differential assembly 54 and is in mesh with bevel gear 57 mounted on shaft 58.

Shaft 58 is connected to the high speed output of gear unit 40 whose low speed output is connected to shaft 59 having a bevel gear 60 mounted thereto. Bevel gear 60 is in mesh with bevel gear 61 keyed to shaft 62 which is connected to one of the symmetrical outputs of differential assembly 63. The other symmetrical output of differential 63 is connected to shaft 64 having bevel gear 65 mounted thereto. Bevel gear 66 is in mesh with bevel gear 65 and is mounted on shaft 67 which is connected to the low speed output of gear unit 41 whose high speed output is connected to shaft 68 at bevel gear 51 mounted thereto.

The gear carrying member (not shown) of differential assembly 63 is mounted directly to driver shaft 42, which is coaxial with shaft 62, while the gear carrying member (not shown) of differential assembly 54 is mounted directly to driven shaft 43 which is coaxial with shaft 56 and supplies the input for servo 69 which will be operatively connected to a shaft position indicator (not shown). The continuous drive for gear train 50 is supplied by motor 70 whose output shaft 71 drives bevel gear 72 which is in mesh with gear 51. Bevel gear 73, in mesh with bevel gear 65, is mounted to shaft 74 which serves as a power take-off to drive an auxiliary device (not shown).

Gear reduction units 40, 41 are symmetrically arranged in the loop of gear train 50, such that the symmetrical outputs of differential 54 will rotate at a greater speed than the symmetrical outputs of differential 63. Thus a rotation of driver shaft 42 will be transmitted from differential 63 through gears 60 and 61 to serve as a low speed input to gear unit 40 and appear as a high speed output which drives gears 55, 57. Similarly, the rotation of driver shaft 42 will be transmitted from differential 63 through gears 64 and 66 to serve as a low speed input to gear unit 41 and appear as a high speed output which drives gears 51, 52. The gears 55, 52 in turn drive differential assembly 54 to impart a motion to driven shaft 43 which is a function of the position of driver shaft 42. Because of the multiplication in speed appearing at shaft 58 over that appearing at shaft 59, the angular displacement of shaft 42 will appear multiplied at driven shaft 43.

Thus, I have provided a novel continuously driven closed loop gearing arrangement whereby a shaft may be connected to means for indicating the angular position of that shaft. The construction is such that inaccuracies in the gear teeth will not effect the reading of the shaft position indicator and backlash will not enter into the indication.

Accordingly, I prefer to be bound not by the specific disclosure herewith but only by the appending claims.

I claim:

1. Means for interconnecting a driver shaft with a driven shaft of a device which is responsive to the angular position of said driver shaft; said means comprising a gear train arranged in a closed loop and adapted for continuous movement; said gear train having a first element connected to said drive shaft and a second element connected to said driven shaft; said gear train having additional elements; continuous movement of said additional elements imparting no movement to said drive and driven shafts.

2. Means for interconnecting a driver shaft with a driven shaft of a device which is responsive to the angular position of said driver shaft; said means comprising a gear train arranged in a closed loop and adapted for continuous movement; said gear train having a first element connected to said drive shaft and a second element connected to said driven shaft; said gear train having additional elements; continuous movement of said additional elements imparting no movement to said drive and driven shafts; said gear train comprising a first and a second differential each having symmetrical outputs comprising portions of said loop; said first and said second elements comprising parts of said first and said second differentials respectively.

3. Means for interconnecting a driver shaft with a driven shaft of a device which is responsive to the angular position of said driver shaft; said means comprising a gear train arranged in a closed loop and adapted for continuous movement; said gear train having a first element connected to said drive shaft and a second element connected to said driven shaft; said gear train having additional elements; continuous movement of said additional elements imparting no movement to said drive and driven shafts; said gear train comprising a first and a second differential each having symmetrical outputs comprising portions of said loop; said first and said second elements comprising parts of said first and said second differentials respectively; said first and said second elements each comprising a rotatable member having a gear freely mounted thereto; said rotatable members of said first and said second differentials being mounted to said driver and said driven shafts, respectively.

4. Means for interconnecting a driver shaft with a driven shaft of a device which is responsive to the angular position of said driver shaft; said means comprising a gear train arranged in a closed loop and adapted for continuous movement; said gear train having a first element connected to said drive shaft and a second element connected to said driven shaft; said gear train having additional elements; continuous movement of said additional elements imparting no movement to said drive and driven shafts; said gear train comprising a first and a second differential each having symmetrical outputs comprising portions of said loop; said first and said second elements comprising parts of said first and said second differentials respectively; said first and said second elements each comprising a rotatable member having a gear freely mounted thereto; said rotatable members of said first and said second differentials being mounted to said driver and said driven shafts, respectively; said symmetrical outputs each comprising a first and a second gear in mesh with said gear.

5. Means for interconnecting a driver shaft with a driven shaft of a device which is responsive to the angular position of said driver shaft; said means comprising a gear train arranged in a closed loop and adapted for continuous movement; said gear train having a first element connected to said drive shaft and a second element connected to said driven shaft; said gear train having additional elements; continuous movement of said additional elements imparting no movement to said drive and driven shafts; said gear train comprising a first and a second differential each having symmetrical outputs comprising portions of said loop; said first and said second elements comprising parts of said first and said second differentials respectively; said first and said second elements each comprising a rotatable member having a gear freely mounted thereto; said rotatable members of said first and said second differentials being mounted to said driver and said driven shafts, respectively; said symmetrical outputs each comprising a first and a second gear in mesh with said gear; said gears of said first and said second differentials respectively having their axes of rotation positioned at right angles to said driver and said driven shafts respectively.

6. Means for interconnecting a driver shaft with a driven shaft of a device which is responsive to the angular position of said driver shaft; said means comprising a gear train arranged in a closed loop and adapted for continuous movement; said gear train having a first element connected to said drive shaft and a second element connected to said driven shaft; said gear train having additional elements; continuous movement of said additional elements imparting no movement to said drive and driven shafts; said gear train comprising a first and a second differential each having symmetrical outputs comprising portions of said loop; said first and said second elements comprising parts of said first and said second differentials respectively; said first and said second elements each comprising a rotatable member having a gear freely mounted thereto; said rotatable members of said first and said second differentials being mounted to said driver and said driven shafts, respectively; said symmetrical outputs each comprising a first and a second gear in mesh with said gear; said gears of said first and said second differentials respectively having their axes of rotation positioned at right angles to said driver and said driven shafts respectively; said first and said second differentials having said first and said second gears thereof mounted to rotate freely about said driver and said driven shafts respectively.

7. Means for interconnecting a driver shaft with a driven shaft of a device which is responsive to the angular position of said driver shaft; said means comprising a gear train arranged in a closed loop and adapted for continuous movement; said gear train having a first element connected to said drive shaft and a second element connected to said driven shaft; said gear train having additional elements; continuous movement of said additional elements imparting no movement to said drive and driven shafts; said gear train comprising a first and a second differential each having symmetrical outputs comprising portions of said loop; said first and said second elements comprising parts of said first and said second differentials respectively; said first and said second elements each comprising a rotatable member having a gear freely mounted thereto; said rotatable members of said first and said second differentials being mounted to said driver and said driven shafts, respectively; said symmetrical outputs each comprising a first and a second gear in mesh with said gear; said gears of said first and said second differentials respectively having their axes of rotation positioned at right angles to said driver and said driven shafts respectively; said first and said second differentials having said first and said second gears thereof mounted to rotate freely about said driver and said driven shafts respectively; said loop also including a first and a second gear reduction unit symmetrically positioned therein and operatively arranged so that motion of said driver shaft appears multiplied at said driven shaft.

8. Means for interconnecting a driver shaft with a driven shaft of a device which is responsive to the angular position of said driver shaft; said means comprising a gear train arranged in a closed loop and adapted for continuous movement; said gear train having a first element connected to said drive shaft and a second element connected to said driven shaft; said gear train having additional elements; continuous movement of said additional elements imparting no movement to said drive and driven shafts; said gear train comprising a first and a second differential each having symmetrical outputs comprising portions of said loop; said first and said second elements comprising parts of said first and said second differentials respectively; said loop also including a first and a second gear reduction unit symmetrically positioned therein and operatively arranged so that motion of said driver shaft appears multiplied at said driven shaft.

9. Means for interconnecting a driver shaft with a driven shaft of a device which is responsive to the angular position of said driver shaft; said means comprising a gear train arranged in a closed loop and adapted for continuous movement; said gear train having a first element connected to said drive shaft and a second element connected to said driven shaft; said gear train having additional elements; continuous movement of said additional elements imparting no movement to said drive and driven shafts; said gear train comprising a first and a second differential each having symmetrical outputs comprising portions of said loop; said first and said second elements comprising parts of said first and said second differentials respectively; said first and said second elements each comprising a rotatable member having a gear freely mounted thereto; said rotatable members of said first and said second differentials being mounted to said driver and said driven shafts, respectively; said symmetrical outputs each comprising a first and a second gear in mesh with said gear; said first and said second gears each comprising a composite member including a bevel section and a spur section.

10. In combination a first and a second differential, a first and a second idler gear, a driver shaft, and a driven shaft; each of said differentials being comprised of a first gear, a second gear, a third gear, and a rotatable member; said third gear being freely mounted on said member; said third gear being interposed between said first and said second gears; said first and said second differentials having their respective said first and said second gears being freely mounted for rotation about said driver shaft and said driven shaft respectively; said first and said second differentials having their respective said members being keyed to said driver shaft and said driven shaft respectively; said first idler gear being interposed between said first gears; said second idler gear being interposed between said second gears; and driving means operatively connected to one of said first gears, said second gears, said first idler gear, and said second idler gear to impart continuous rotation to each of the aforesaid gears while said driver and said driven shafts are stationary.

11. In combination a first and a second differential, a first and a second idler gear, a driver shaft, and a driven shaft; each of said differentials being comprised of a first gear, a second gear, a third gear, and a rotatable member; said third gear being interposed between said first and said second gears; said first and said second differentials having their respective said first and said second gears being freely mounted for rotation about said driver shaft and said driven shaft respectively; said first and said second differentials having their respective said members being keyed to said driver shaft and said driven shaft respectively; said first idler gear being interposed between said first gears; said second idler gear being interposed between said second gears; and driving means operatively connected to one of said first gears, said second gears, said first idler gear, and said second idler gear to impart continuous rotation to each of the aforesaid gears while said driver and said driven shafts are stationary; said first and said second gears each comprising a composite member including a bevel section and a spur section; said bevel sections being in mesh with said third gear and said spur sections being in mesh with said idler gears.

12. In combination a first and a second differential, a first and a second gear reduction unit; each of said differentials being comprised of a first gear, a second gear, a third gear, and a rotatable member; said third gear being freely mounted on said member; said third gear being interposed between said first and said second gears; said first and said second differentials having their respective said first and said second gears being freely mounted for rotation about said driver shaft and said driven shaft respectively; said first and said second differentials having their respective said members being keyed to said driver shaft and said driven shaft respectively; said first gear reduction unit being interposed between said first gears; said second gear reduction unit being interposed between said second gears; and driving means operatively connected to one of said first gears, said second gears, said gear reduction unit gear, and said second gear reduction unit to impart continuous rotation to each of the aforesaid gears while said driver and said driven shafts are stationary; said gear reduction units being operatively arranged so that motion of said driver shaft appears multiplied at said driven shaft.

References Cited in the file of this patent

UNITED STATES PATENTS

| | | |
|---|---|---|
| 2,660,860 | Taub | Dec. 1, 1953 |
| 2,660,861 | Schmitt | Dec. 1, 1953 |
| 2,730,913 | Friedman | Jan. 17, 1956 |
| 2,757,556 | Uebing | Aug. 7, 1956 |